F. J. TONE.
METHOD OF TREATING ALUMINUM ORES.
APPLICATION FILED MAR. 3, 1909.
929,517.
Patented July 27, 1909.
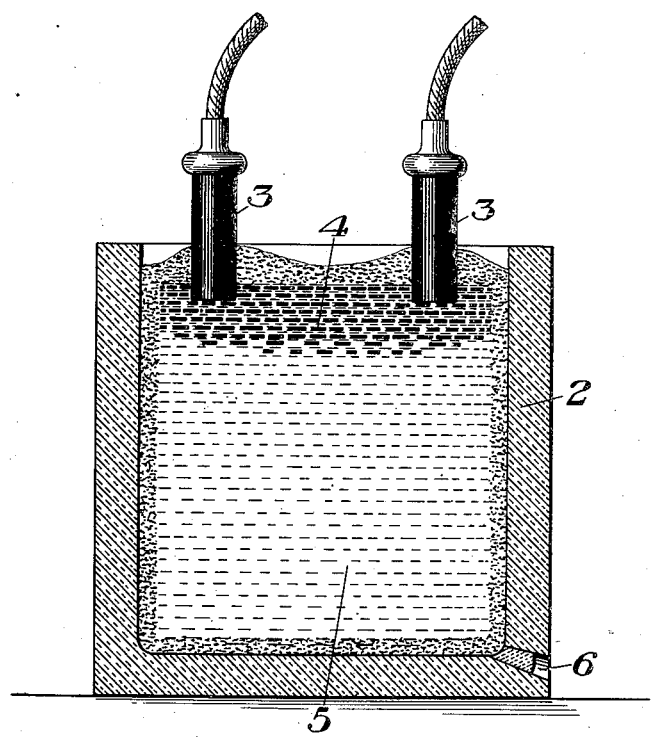
WITNESSES
INVENTOR

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF TREATING ALUMINUM ORES.

No. 929,517.    Specification of Letters Patent.    Patented July 27, 1909.

Application filed March 3, 1909. Serial No. 481,034.

*To all whom it may concern:*

Be it known that I, FRANK J. TONE, of Niagara Falls, Niagara county, New York, have invented a new and useful Method of Treating Aluminum Ores, of which the following is a full, clear, and exact description, reference being had to the accompanying drawings, forming part of this specification in which—

The figure is a vertical section of one form of electric furnace suitable for the practice of my invention.

In my previous patent, No. 906,172 of December 8, 1908, I have described a process for smelting aluminum ores, in which I subjected to heat in an electric furnace a mixture consisting of aluminum silicate, carbon and base metalliferous material, such as iron oxid, the latter constituent being added in order to facilitate the reduction of the silicon. Under proper conditions the products resulting from this process are pure fused alumina and silicon alloy. I have discovered that when the base metalliferous material is added in the form of natural emery ore, which consists usually of alumina always associated with impurities such as iron oxid, silica and titanium oxid, the reduction of the silica and the fusion of the alumina are facilitated and the working of the furnace is greatly improved.

For carrying out the process in its preferred form, the mixture is made of aluminum silicate, pulverized emery and carbon, the carbon being present in an amount sufficient to reduce all the oxids other than alumina, but insufficient to reduce the alumina. The mass of mixture is then placed between the electrode terminals of an electric furnace and current is passed through it. As the heating of the mass progresses and it becomes partially fused its conductivity increases and when it reaches a well fused condition, the charge becomes a good conductor of the electricity. The current in passing through this mixture generates heat and the furnace operates as a simple resistance furnace, the resistance conductor being the fused charge.

In the drawing, 2 represents a receptacle, preferably made of refractory material to contain the charge, and 3, 3 are the electrode terminals connected with a source of electric current and depending into the furnace chamber at separated points. The lower ends of the electrodes make contact with the mass of mixture, 4, which is undergoing fusion, and is also in process of reduction.

5 represents the finished product completely fused, consisting of practically pure alumina with globules of the metallic reduction products consisting of iron, silicon and titanium mixed and agglomerated therewith. The charge mixture 4 is supplied from time to time around and between the electrodes as the previous charge becomes reduced.

When working with a mixture of aluminum silicate and emery, instead of aluminum silicate and iron oxid, I attribute the improved working of the furnace to the fact that the base metalliferous material added as emery makes the mixture very much less conductive than the same amount of base metalliferous material added as iron oxid. The efficient working of the furnace depends upon the proper conductive relations of the charge and the material undergoing reduction and fusion. It is desirable to have sufficient base metalliferous material to form a low silicon alloy, but an excessive amount makes the fused bath too conductive and does not permit of the operation of the process as a resistance process to the best advantage.

The advantage in the use of emery as base metalliferous material lies in the fact that it supplies the necessary base metal to alloy with the silicon and to facilitate the reduction of the silica without at the same time greatly lowering the resistance of the fused charge. The electrodes are raised from time to time as the column of purified product increases and the zone of fusion and reduction is elevated into the fresh charge. There is thus formed a column of finished product to any height desired. The reduction and fusion zone follows the elevation of the electrodes, and in this way the process is continued until there has been formed an ingot of fused alumina of convenient size, or sufficient to fill the furnace chamber, when the operation is stopped and the ingot is allowed to cool. It is then broken up and crushed, and the alumina separated from the metallic reduction product by concentration or other well known methods. If desired, instead of allowing the reduced metal to cool with the alumina, portions of the metallic alloy which settle to the bottom of the furnace and remain in a fused condition may be tapped from time to time from the furnace through a suitable tap hole as shown at 6.

My invention presents many advantages over the arc method of heating, since a more moderate heat may be employed and the temperature is regulated so as to reduce the iron, silica and other impurities without attacking the alumina. When a charge of this character is submitted to the full heat of an electric arc it is impossible to reduce the iron and silica without also reducing a considerable portion of alumina; and this disadvantage is obviated by my method.

The method is of further great advantage in that the furnace may be operated continuously with automatic and inherent regulation of the heat distribution and of the reduction and fusion zones. The treatment of the fused alumina may also be carried out in such a way as to obtain the most desirable properties in the finished product.

The alumina which I obtain in this process has many valuable commercial uses. It has great hardness and abrasive qualities making it useful in the manufacture of grinding wheels where emery and corundum have previously been used. It may be used for the further manufacture of aluminum compounds. It is very refractory and may be used in fire brick, especially for basic linings. The iron alloys which are formed in this process may also be used in the metallurgy of iron and steel.

I claim:

1. The process of treating aluminum ores, which consists of making a mixture of aluminum silicate, emery and carbon, the amount of carbon being sufficient to reduce the silica and all compounds in the mixture except alumina, but insufficient to reduce the alumina, interposing this mixture as a resistance conductor between electrodes, passing current through the same sufficient to fuse the alumina and reduce the other constituents to metallic form and keeping the temperature of the charge below the reduction temperature of alumina; substantially as described.

2. The process of treating aluminum ores, which consists of making a mixture of aluminum silicate, emery and carbon, the amount of carbon being sufficient to reduce the silica and all compounds in the mixture except alumina, but insufficient to reduce the alumina, interposing this mixture as a resistance conductor between electrodes, passing current through the same sufficient to fuse the alumina and reduce the other constituents to metallic form and keeping the temperature of the charge below the reduction temperature of alumina, and finally, separating the alumina from the metallic reduction product; substantially as described.

In testimony whereof, I have hereunto set my hand.

FRANK J. TONE.

Witnesses:
 ASHMEAD G. RODGERS,
 ARCHIE D. KYSER.